United States Patent
Beeck

(10) Patent No.: US 6,333,069 B1
(45) Date of Patent: Dec. 25, 2001

(54) METHOD FOR PREVENTING HARM FROM CONSTRICTIONS FORMED DURING COATING WITH A PROTECTIVE COAT IN THE COOLING HOLES OF GAS-COOLED PARTS

(75) Inventor: Alexander Beeck, Kussaberg (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/465,767

(22) Filed: Dec. 17, 1999

(30) Foreign Application Priority Data

Dec. 23, 1998 (DE) ................................ 198 59 763

(51) Int. Cl.[7] .................................................... B32B 35/00
(52) U.S. Cl. ......................... 427/142; 427/140; 427/156; 427/235; 427/239; 427/287; 427/300
(58) Field of Search ..................... 422/140, 142, 422/156, 235, 239, 287, 300

(56) References Cited

U.S. PATENT DOCUMENTS

| 4,501,776 | 2/1985 | Shankar . | |
|---|---|---|---|
| 4,743,462 | * 5/1988 | Radzavich et al. | ..................... 427/34 |
| 5,216,808 | 6/1993 | Martus et al. . | |
| 5,441,767 | 8/1995 | DeSaulniers . | |
| 5,702,288 | 12/1997 | Liebke et al. . | |
| 5,800,695 | 9/1998 | Kang et al. . | |
| 5,902,647 | * 5/1999 | Venkataramani et al. | ........... 427/454 |
| 6,004,620 | * 12/1999 | Camm | ................................... 427/142 |
| 6,042,879 | * 3/2000 | Draghi et al. | ......................... 427/142 |

FOREIGN PATENT DOCUMENTS 0 807 744   11/1997   (EP) .

* cited by examiner

Primary Examiner—Shrive P. Beck
Assistant Examiner—Jennifer Kolb
(74) Attorney, Agent, or Firm—Burns, Doane, Swecker & Mathis, L.L.P.

(57) ABSTRACT

A method is disclosed for preventing harm caused by constrictions in the cooling holes of gas-cooled parts, in particular of gas turbines and/or burners. These constrictions form because the walls of the gas-cooled parts through which the cooling holes extend and which are covered on their outside with a protective, first coating are provided during the course of an overhaul with a second, repeat coating, and coating material is deposited in the cooling holes. Constant flow ratios in the cooling holes are achieved in a simple manner in that prior to the overhaul, the cooling holes are constricted with first means to an extent that corresponds to the later constrictions created during the course of the second coating. The first means are removed after the overhaul. The first means takes the form of an insert with holes that constrict the flow through the cooling holes.

4 Claims, 2 Drawing Sheets

METHOD FOR PREVENTING HARM FROM CONSTRICTIONS FORMED DURING COATING WITH A PROTECTIVE COAT IN THE COOLING HOLES OF GAS-COOLED PARTS

FIELD OF THE INVENTION

The invention relates to the field of technology of thermal machines, in particular gas turbines and/or burners, having walls of gas-cooled parts through which the cooling holes extend and which are covered on their outside with a protective coating.

BACKGROUND OF THE INVENTION

The coating of thermally stressed parts of gas turbines or burners equipped for the cooling of their walls with cooling holes for the air or gas cooling usually cannot be renewed easily by using overlay coating and/or thermal barrier coating, TBC, because the cooling holes are at least partially closed or constricted by the repeat coating, so that the cooling effect is changed and/or adversely affected. This is true, in particular, if the cooling holes have been provided in the wall after the original coating.

Several solutions have been described for preventing harm from constrictions formed when coating parts provided with cooling holes. In one type of solution, measures are taken to prevent the constrictions from even forming. To accomplish this, the cooling holes are closed or filled prior to the coating. The filling of the cooling holes prevents coating material from penetrating into the holes. After the coating process is complete, the filling is again removed from the cooling holes, and the cooling holes are available with their original through-cross-section. Such techniques are known, for example, from U.S. Pat. No. 4,743,462 and U.S. Pat. No. 5,800,695.

In another proposed solution, the cooling holes are left open, and the constrictions formed in the holes during coating are removed after the coating, by using a pluse UV laser beam as is known from U.S. Pat. No. 5,216,808. It would also be conceivable, however, to remove the constrictions by pressing a grinding fluid through the cooling holes (U.S. Pat. No. 5,702,288) that abrades the constrictions in this manner.

The disadvantage of this method is that the individual cooling holes must be carefully closed and then again exposed or freed from the constriction again carefully so that the originally intended cooling effect is fully preserved at all places on the cooled part, and no local overheating occurs as a result of insufficiently removed constrictions. In parts equipped with a large number of finely distributed cooling holes, this creates significant work during the processing.

SUMMARY OF THE INVENTION

It is therefore the objective of the invention to provide a method in which the through-cross-section of the individual cooling holes can, in a simple manner and without intensive filling or abrasion steps, practically be held constant during the repeat coating of the parts. This objective is accomplished by permitting constrictions of the cooling holes to be formed during the repeat coating. The constant through-cross-section of the cooling holes is achieved by using cooling holes with a larger through-cross-section than needed, and the desired through-cross-section is adjusted with an artificial constriction. If the cooling holes later are constricted during the re-coating due to a deposit of the coating material, the artificial constriction is removed. Since the artificial constriction is chosen so that it corresponds to the constriction forming during the re-coating, the through-cross-section of the cooling holes also is maintained after the re-coating.

A preferred embodiment of the method according to the invention is characterized in that the first means include first inserts that rest in a covering manner against the insides of the walls and are provided with first openings, each of which is associated with the individual cooling holes and which constrict these cooling holes. Such prefabricated inserts make it possible to simultaneously and evenly constrict all cooling holes in a simple manner.

In a preferred further development of this embodiment, the first inserts are taken away after the overhaul without any substitutions. This makes it especially simple to remove the artificial constrictions.

If, however, the inserts have a permanent function in the part, it is, according to another further development of the embodiment, advantageous to replace the first inserts after the overhaul with second inserts that have second openings that are larger than those of the first inserts.

BRIEF DESCRIPTION OF THE DRAWINGS

Preferred embodiments of the invention are described in more detail below in reference to the drawings, in which.

DETAILED DESCRIPTION OF THE INVENTION

Figure 1:
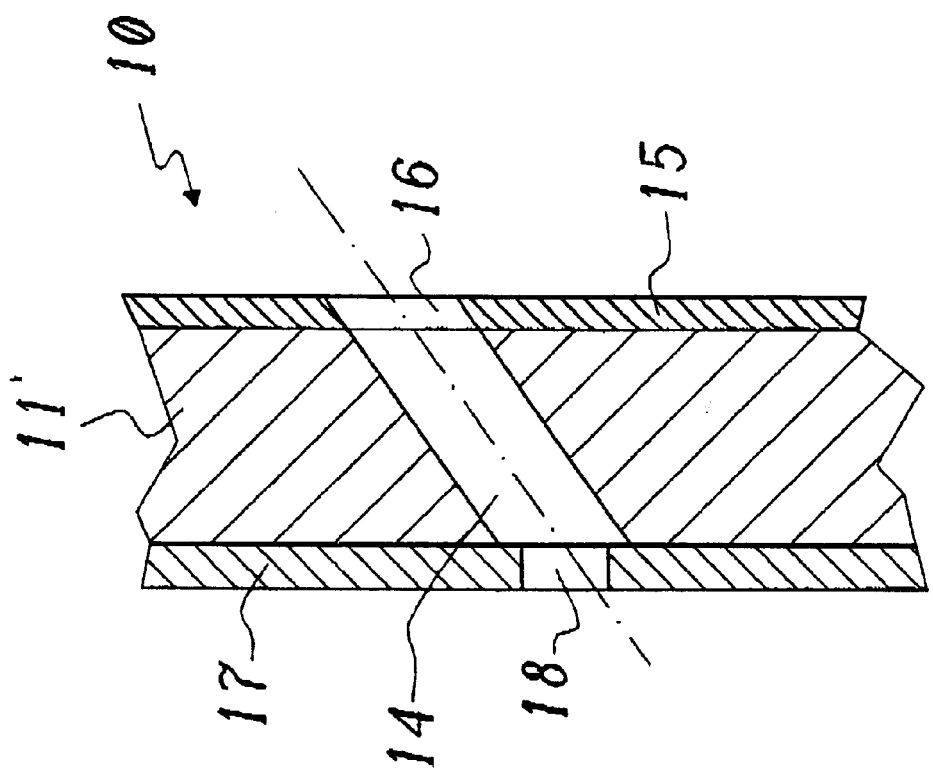
FIG. 1 shows a cross-section view of a section of the wall of a gas-cooled part with a representative cooling hole with an enlarged through-cross-section and a first (original) coating as necessary for performing the method according to the invention.

The method according to the invention involves a part (turbine blade, etc.), a section of which is shown in a generalized form in the cross-section in FIG. 1. The gas- or air-cooled part 10 comprises a wall 11 with an inside 12 and an outside 13. The wall 11 is provided with a plurality of cooling holes 14, of which one is shown representatively in the figure. The cooling holes 14 may extend vertically through the wall 11 or—as shown in FIG. 1—at an oblique angle to it. On the outside 13, the wall is provided with a first, original coating 15 created in the usual manner (for example by plasma spraying) and may consist of materials known per se (for example, an aluminide). The first coating 15 is provided in the area of the cooling holes 14 with one each opening 16 that is adapted in its cross-section to the cooling holes. This may be accomplished, for example, in that the cooling holes 14, are only drilled into the wall 11 after the first coating 15 has been applied.

Figure 2:
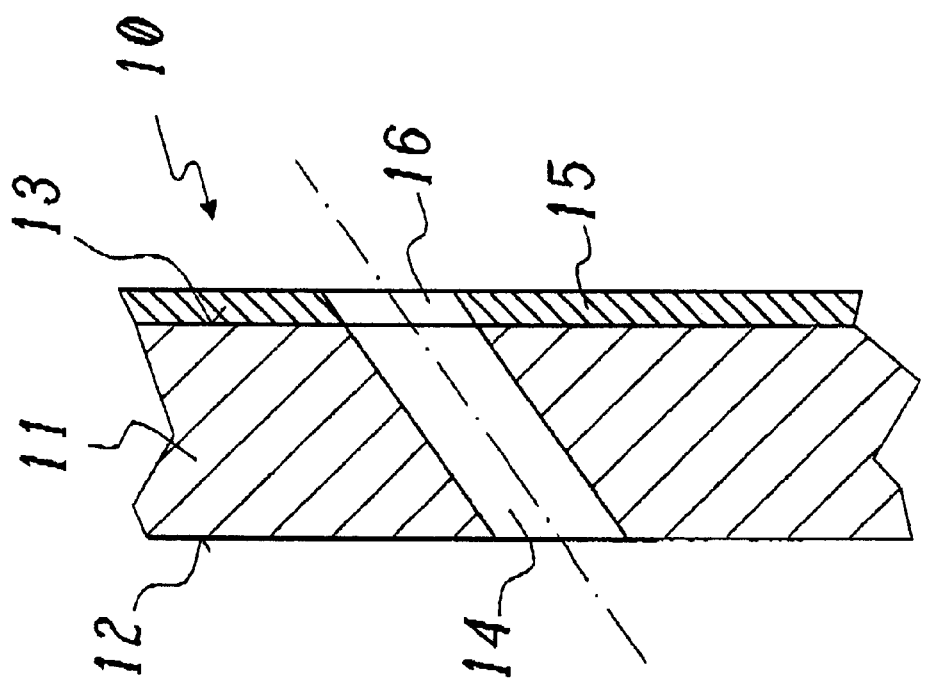
FIG. 2 shows the part of FIG. 1 with the artificial constriction of the cooling hole through a first insert resting against the wall from the inside.

The inside diameter of the cooling holes 14 or their through-cross-section has been chosen from the start larger than necessary for the intended cooling effect. In order to achieve the actually needed cross-section, FIG. 2 provides that on the inside 12 of the wall 11 an insert 17 is arranged that covers the inside 12 of the wall 11 and is only provided in the area of the cooling holes 14 with one each opening 18 that has been selected with smaller through-cross-section or diameter than the cooling hole 14, and in this way represents an artificial constriction for the cooling hole 14. The artificial constriction restricts the flow of the cooling medium through the cooling hole 14. Through-cross-section or diameter of the openings 16 are hereby selected so that the artificial constriction acts in the same manner as the constriction created later during the re-coating due to material deposition.

Figure 3:
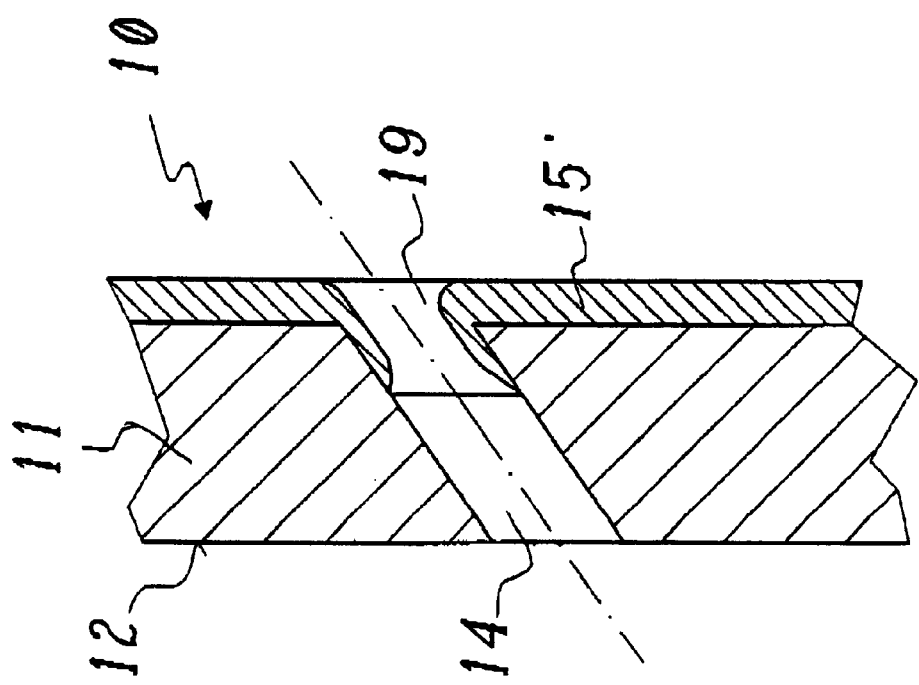
FIG. 3 shows the part of FIG. 1 after the re-coating with the constriction of the cooling hole caused by the re-coating and the first insert has been taken away; and, FIG. 4 shows the part from FIG. 1 after the re-coating with the constriction of the cooling hole caused by the re-coating; the first insert, as an alternative to FIG. 3, has been replaced with a second insert which is equipped with a not further constricting second opening for each cooling hole.

If another coating 15' is applied on the outside of the wall 11—as shown in FIG. 3—during a re-coating, coating material is deposited in the spared area of the unprotected cooling hole 14 and forms a constriction 19. If the first insert 17 of FIG. 2 with the constricting openings 18 is now removed (FIG. 3), the artificial constriction of the respective cooling hole created by the opening 18 is equivalently replaced by the constriction 19 so that the flow rations in the cooling hole 14 remain practically unchanged. This eliminates the necessity of in any way preventing the constriction 19 caused by deposition or the necessity of removing it after the fact. The use of the insert 17 has the advantage that all cooling holes are simultaneously and evenly constricted with a single, prefabricatable part, and the constriction later also can be eliminated again simultaneously. In principle, it would also be conceivable, however, to artificially constrict the cooling holes individually, which would require that additional expenditure be tolerated.

Figure 4:
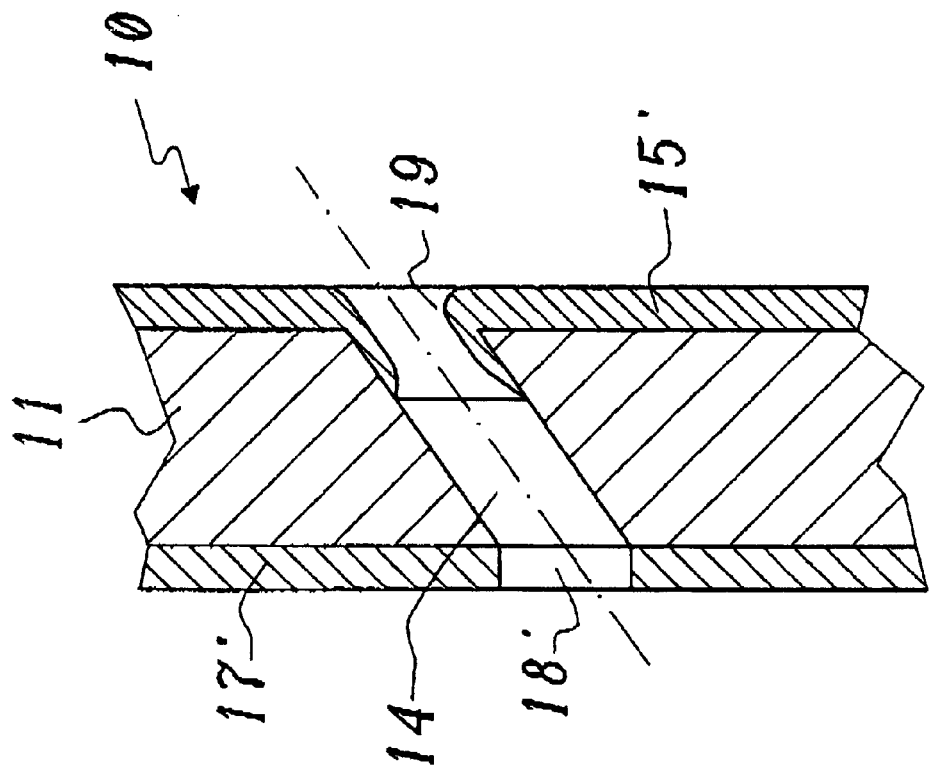

If the insert 17 is a functional part of the part 10, it is useful that is replaced—as shown in FIG. 4—after the re-coating with a second insert 17' in which the constricting holes 18 are replaced with larger, non-constricting holes 18'.

What is claimed is:

1. A method for maintaining the effective cross-sectional area of cooling holes of gas cooled parts during repeated coating operations, the method comprising:

(a) providing a gas cooled part having an inside surface and an outside surface, and having a protective coating on the outside surface;

(b) forming a cooling hole extending through the part and through the protective coating, the hole having a predetermined cross-sectional area larger than a desired effective cross-sectional area for the cooling hole;

(c) applying an insert over the inside surface, the insert having an opening with a cross-sectional area less than the predetermined cross-sectional area of the cooling hole and the insert opening being aligned with the cooling hole;

(d) applying a second protective coating on the outside surface, the second protective coating extending into the cooling hole, thereby forming a constriction in the cooling hole having a cross-sectional area less than the predetermined cross-sectional area of the cooling hole; and (e) removing the insert from the inside surface, whereby the effective cross-sectional area of the cooling hole and therefore the cooling gas flow rate through the cooling hole is determined by the constriction formed in the cooling hole by the second protective coating.

2. The method according to claim 1 wherein the insert opening has substantially the same cross-sectional area as the constriction formed in the cooling hole by the second protective coating.

3. The method according to claim 1 wherein the insert opening has a substantially smaller cross-sectional area than the predetermined cross-sectional area of the cooling hole.

4. The method according to claim 1, further including:

removing the insert; and replacing the insert with a second insert, the second insert having a hole with a cross-sectional area that is substantially the same as the predetermined cross-sectional area of the cooling hole.

\* \* \* \* \*